Patented May 16, 1939

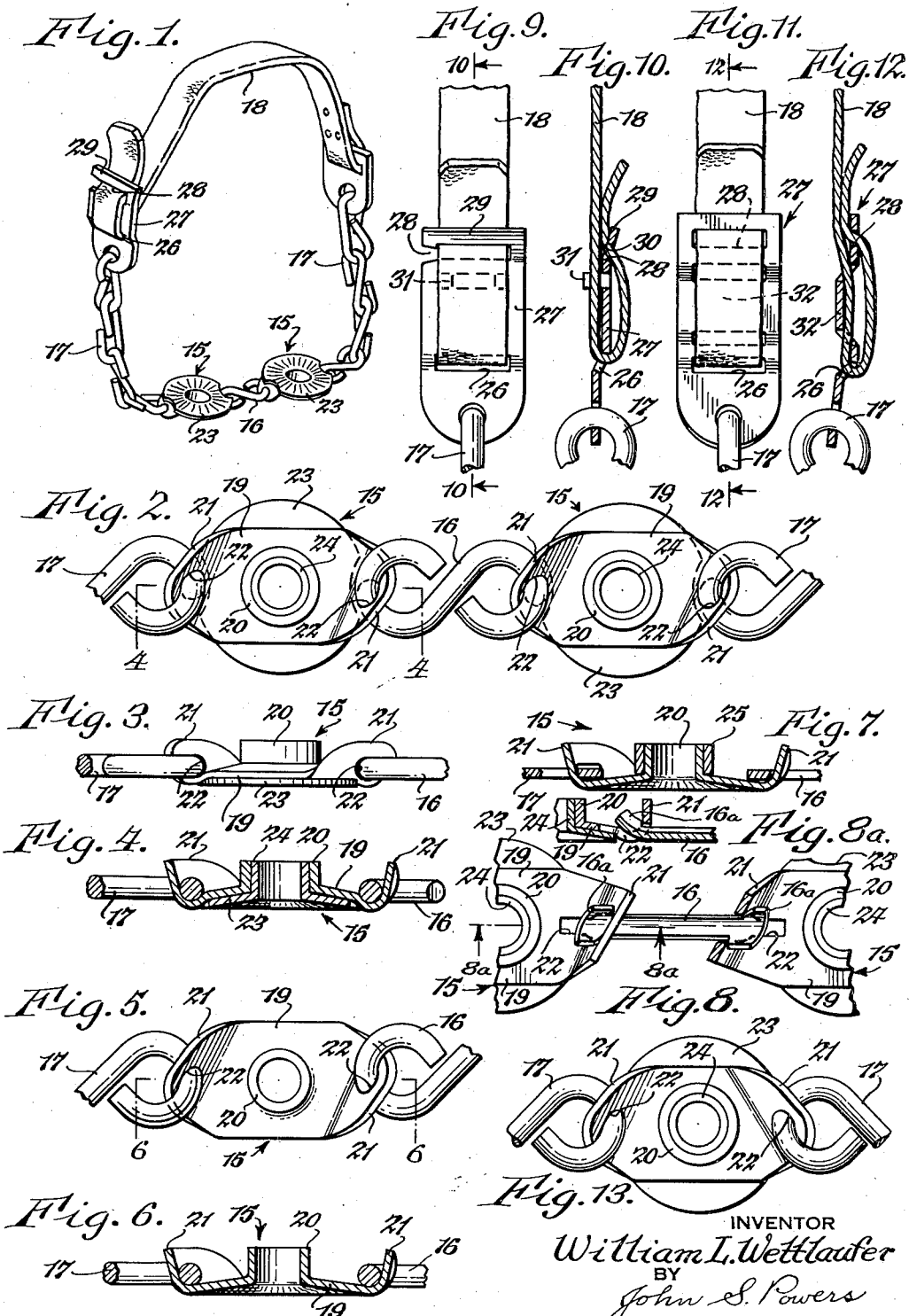

2,158,264

UNITED STATES PATENT OFFICE 2,158,264

ANTISKID DEVICE

William L. Wettlaufer, Buffalo, N. Y.

Application January 20, 1938, Serial No. 185,919

8 Claims. (Cl. 152—245)

This invention relates to improvements in antiskid devices for vehicle wheels.

One object of the invention is to provide an anti-skid device which may be attached and detached with facility and which will not creep around the wheel when in use.

A further object is to provide a device which is so designed that excessive wearing of it or the tire of the wheel to which it is applied is prevented.

A still further object is to provide a device having traction providing elements which will offer resistance to skidding in all directions, which are so constructed that wearing will be minimized and substantially uniform and which may be replaced with facility.

A still further object is to provide a device which is simple, light and economical in design.

The invention is illustrated in the accompanying drawing in which:

Figure 1 is a perspective view of an anti-skid device in which the features of the invention are incorporated.

Figure 2 is an enlarged plan view of the traction providing elements of the device.

Figure 3 is a side view of one of the said elements.

Figure 4 is a section taken along line 4—4 of Figure 2.

Figure 5 is a view similar to Figure 2 and shows a modified form of traction providing element.

Figure 6 is a section taken along line 6—6 of Figure 5.

Figure 7 is a view similar to Figure 4 and shows another embodiment of the invention.

Figure 8 is a top view of traction providing elements similar to those shown in Figure 2 and illustrates a modified form of connecting link.

Figure 8a is a fragmentary section and is taken along line 8a—8a of Figure 8.

Figure 9 is an enlarged view of the buckle (Figure 1) of the device.

Figure 10 is a section taken along line 10—10 of Figure 9.

Figure 11 is a view similar to Figure 9 and shows a modified form of buckle.

Figure 12 is a section taken along line 12—12 of Figure 11.

Figure 13 is a view similar to Figure 5 and shows another form of traction providing element.

This device, as illustrated, includes a pair of traction providing elements 15 which are connected together by a link 16 and which are adapted to be secured across the tread of the tire of a vehicle wheel by chain sections 17 and a strap 18, the number of such elements being optional and depending primarily upon the size of the tire. Each of the elements 15 includes a body 19, preferably of pressed metal, having a central hollow projection 20 and diagonally extending end flanges 21, said projection and flanges preferably being of substantially the same height. The flanges 21 may be formed so that they are substantially parallel as shown in Figure 2. Preferably, however, they are angularly inclined with respect to one another as illustrated in Figure 13. The projection and flanges are adapted to grip the surface over which the vehicle is passing and offer resistance to skidding in all directions.

In accordance with the invention the elements 15 are connected to the link 16 and the chain sections 17 through the agency of the end flanges 21, there being holes 22 formed in the bases of the said flanges for this purpose. The links pass through the said holes and around one end of each of the respective flanges. They are preferably flat and are, therefore, substantially parallel with the tread of the tire and are held against, or in close proximity to, the tire, those portions which pass through the holes 22 being located between the projections 20 and the flanges 21 and being spaced from the surface over which the vehicle is passing. Wearing of the links and joints is thus minimized.

In the embodiment illustrated in Figure 2 a disc 23 is carried by the body 19. The said disc is shaped to conform to the tire and is preferably knurled over the area which fits against the tire. It is formed with a central annular flange 24 which is of substantially the same height as, and which fits tightly within, the projection 20, thereby to increase substantially the thickness of the surface gripping wall. It will be noted (see Figures 3 and 4) that the ends of the body 19 of the element extend beyond the disc 23 and are bent in the direction of the tire. The ends of the body, therefore, provide continuations of the disc and at the same time enable the ends of the supporting links to be moved closer to the tread of the tire, and hence further away from the surface engaged by the elements. The use of the disc 23 in the manner described is optional and may be dispensed with, as illustrated in Figures 5 and 6, if this is desired. In such case the back of the body 19 is preferably knurled in order to prevent the element from creeping around the tire.

In the embodiment shown in Figure 7 a ring 25 is secured upon the hollow projection 20 of the body, thereby to increase the thickness of the surface engaging wall without increasing the thickness of that portion of the body which bears against the tread of the tire. The element 15 is otherwise generally similar to that shown in Figure 6 with the exception that the links which connect the elements to one another and to the chain sections are illustrated as being flat. Such links are thinner and will, therefore, be held further away from the surface which is engaged by the gripping edges of the elements.

The traction providing elements shown in Figures 8 and 8a are generally similar to those illustrated in Figure 2. In this embodiment, however, the openings 22 which are formed at the bases of the flanges are T-shaped, the link for connecting the elements being in the form of a bar, slightly convex in the direction of the tire, and having heads 16a at its opposite ends which are inserted through said openings and thereafter adjusted so that they engage the inner walls of the adjacent flanges of the elements to hold the parts assembled. The link is relatively flat and will assume a position close to the tire. It permits the elements to move freely to adjust themselves against the tire in such a manner as to guard against injury to the latter and provides for facility in the replacement of worn parts.

In securing the device to a wheel the traction providing elements are fitted against the tread of the tire and are secured in such position by the strap 18, the free end of the latter being inserted through a slot 26 in a buckle 27. The strap is drawn tight and the free end then moved laterally and caused to enter edgewise an open ended slot 28. One side of the latter is defined by an arm 29 which is bent slightly so that a rear edge 30 thereof (see Figure 10) will bite into the strap and hold it against slipping lengthwise. Short projections 31 which are preferably struck from the body of the buckle engage behind the strap and hold the latter so that it will be positioned in close proximity to the side wall of the tire. This may also be accomplished by the use of the buckle shown in Figures 11 and 12 wherein the projections 31 (shown in Figures 9 and 10) are replaced by a continuous bar 32, the slot 28 in this instance being closed throughout its entire length and requiring the end of the strap to be inserted lengthwise.

The device described has the advantage that the traction providing elements are held against the tire in such a manner that creeping is prevented. Excessive wearing of the tire is thus avoided. At the same time the elements are caused to engage the surface to be gripped in such a manner that any wearing which takes place will be uniform. As the links are protected by the gripping projections and flanges their injury or impairment by the surface over which the vehicle wheel passes is minimized. A further advantage obtained is that the traction providing elements may, if desired, be produced from sheet metal in simple die stamping operations. Simplicity, lightness and low cost of production are thus insured, it being understood that the use of the discs 23 and rings 25 in the manner described enables these parts to be readily replaced by new parts when they become so worn as to be unsuitable for further use.

I claim as my invention:

1. In an anti-skid device, the combination with a traction providing element, said element comprising a sheet metal body having diagonally extending flanges which provide surface gripping edges, said flanges having holes in their bases, of means for securing said element to the tire of a vehicle wheel, said means passing through said holes and around the ends of said flanges so that the joints thus provided are protected.

2. In an anti-skid device, the combination with a traction providing element, said element comprising a metal body having diagonally extending flanges which provide surface gripping edges, said flanges having holes formed adjacent their bases, of means for securing said element to the tire of a vehicle wheel, said means including chain links which pass through said holes and around the ends of said flanges so that the joints thus provided are protected.

3. In an anti-skid device, the combination with a traction providing element, said element comprising a metal body having a central projection and diagonally extending flanges which provide surface gripping edges, said flanges having holes formed adjacent their bases, of means for securing said element to the tire of a vehicle wheel, said means including chain links which pass through said holes and around the ends of said flanges between said projection and flanges so that the joints thus provided are protected.

4. In an anti-skid device, the combination with a traction providing element, said element comprising a pressed sheet metal body having an annular central projection and diagonally extending flanges, said projection and flanges being of substantially the same height and providing surface gripping edges, said flanges having holes formed in their bases, of means for securing said element to the tire of a vehicle wheel, said means including chain links which pass through said holes and around the ends of said flanges between said projection and flanges so that the joints thus provided are protected.

5. In an anti-skid device, the combination with a traction providing element, said element comprising a metal body having a central hollow projection and marginal flanges which provide surface gripping edges and a disc which fits against the back of said body and which is formed with a neck which fits within said hollow projection to increase the thickness of the wall which provides said surface gripping edges, of means for securing said element to the tire of a vehicle wheel, said means being connected to the bases of said flanges so that the joints thus provided are protected.

6. In an anti-skid device, the combination with a traction providing element, said element comprising a pressed sheet metal body having a central annular projection and marginal flanges which provide gripping edges and a disc which fits against the back of said body and which is adapted to fit conformably against the tire of the vehicle wheel, said disc having a neck which fits within said annular projection to increase the thickness of the wall which provides said gripping edges, said flanges having holes formed in their bases, of means for securing said element to said tire, said means including chain links which pass through said holes and around the ends of said flanges between said projection and flanges so that the joints thus provided are protected.

7. In an anti-skid device, the combination with a traction providing element, said element comprising a metal body having a central projection and diagonally extending marginal flanges which provide surface gripping edges and a ring which fits around said projection to increase the thickness of the wall which provides said gripping edges, of means for securing said element to the tire of a vehicle wheel, said means being connected to the bases of said flanges so that the joints thus provided are protected.

8. In an anti-skid device, the combination with a traction providing element, said element comprising a pressed sheet metal body having a central annular projection and diagonally extending marginal flanges which provide gripping edges, said body being adapted to fit conformably against the tire of the vehicle wheel and a ring which fits over said projection to increase the thickness of the wall which provides said gripping edges, said flanges having holes formed in their bases, of means for securing said element to said tire, said means including chain links which pass through said holes and around the ends of said flanges between said projection and flanges so that the joints thus provided are protected.

WILLIAM L. WETTLAUFER.